United States Patent Office 3,169,948
Patented Feb. 16, 1965

3,169,948
PRODUCTION OF POLYMERS OF ALKYL-SUBSTITUTED VINYL AROMATIC COMPOUNDS
George F. Hardy, Drexel Hill, Pa., assignor to Allied Chemical Corporation, New York, N.Y., a corporation of New York
No Drawing. Filed Oct. 22, 1959, Ser. No. 847,897
6 Claims. (Cl. 260—88.2)

The present invention relates to a process for the production of high molecular weight polymers of alkyl-substituted vinyl aromatic compounds. More specifically, the invention relates to a combination of correlated operating conditions whereby reproducible high molecular weight polymers of alkyl-substituted vinyl aromatic compounds are obtained in high conversion.

The polmerization of alkyl-substituted vinyl aromatic compounds in the presence of alkali metal catalysts and in the presence or absence of solvents is well-known. However, reproducible high molecular weight polymers have not been obtained in high conversion without taking extreme precautions with respect to purity of reagents, etc.

It is the principal object of this invention to provide a simple and economical process for the obtainment in high conversion of reproducible high molecular weight polymers of alkyl-substituted vinyl aromatic compounds, particularly of alpha-alkyl styrenes and copolymers thereof with styrene.

A further object is to provide improvements in the polymerization of alkyl-substituted vinyl aromatic compounds by alkali metal catalysis.

Still a further object is to provide a process for obtaining uniform beads of polymers of alkyl-substituted vinyl aromatic compounds suitable for direct use as molding powders.

Other objects and advantages of the invention will be apparent to one skilled in the art from the following description and examples.

The above objects are realized by polymerizing a monomer material selected from the group consisting of alkyl-substituted vinyl aromatic compounds and mixtures of said alkyl-substituted vinyl aromatic compounds and styrene in the presence of (1) a catalyst selected from the group consisting of alkali metals, alkali metal hydrides, alkali metal alkyls and alkali metal aryls, (2) a diluent comprising an aliphatic hydrocarbon and (3) an activator comprising an ether selected from the group consisting of alkyl monoethers containing at least one methyl group, dialkyl ethers of ethylene glycol, dialkyl ethers of polyethylene glycols and tetrahydrofuran, at least about two-thirds by weight of the monomer material being added in gradual manner subsequent to the other polymerization ingredients.

By polymerizing under the above correlated operating conditions, polymers of alkyl-substituted vinyl aromatic compounds are obtained in high conversion. Moreover, the polymers exhibit high molecular weights which may be reproduced in succeeding batches. These polymers, which possess uniform processing characteristics, may be molded to products having uniform physical properties, e.g. flexural and tensile strength.

Alkyl-substituted vinyl aromatic compounds suitable for use in the present invention include alkyl styrenes and alkyl vinyl naphthalenes. Alpha-alkyl styrenes, the preferred alkyl-substituted vinyl aromatic compounds, have the following general formula:

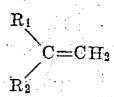

In the formula, $R_1$ is phenyl and $R_2$ is an alkyl group such as methyl, ethyl, propyl, isopropyl, etc., but is preferably methyl.

The invention also contemplates the copolymerization of alkyl-substituted vinyl aromatic compounds and styrene. The styrene constitutes preferably less than about 50% by weight of the monomer mixture, particularly outstanding copolymers being produced from monomeric mixtures containing less than about 30% by weight of styrene.

The monomer material may contain aliphatic hydrocarbons in any amount. Although the presence of aromatic hydrocarbons is not desirable, such compounds can be tolerated in minor amounts. Water, alcohols, carbon dioxide and similar materials which decompose organoalkali compounds must be absent. Generally, monomer materials of the purity commonly used for present commercial polymerization processes are suitable. The monomer material is distilled in the absence of air before use for best results, particularly to preclude substantial discoloration on molding of the polymer.

The catalyst employed in the process of the present invention is selected from the class consisting of alkali metals, their hydrides, alkyls (e.g. amyl sodium and aryls (e.g. phenyl sodium). Of the alkali metals, potassium and particularly sodium are preferred. The activity of these catalysts is proportional to their surface area; hence, it is desirable to employ them in finely divided state.

The alkali metal catalysts may be prepared in finely divided form by dispersing them in conventional manner in inert liquids such as petrolatum, light mineral oil, toluene or heptane. Dispersing agents which aid in the preparation of such catalysts may be used, if desired.

Although the amount of the catalyst is to some extent dependent upon its state of subdivision, concentrations in the neighborhood of about 0.1 to 10%, preferably about 0.3 to 3 %, by weight of the monomer are normally adequate to effect the desired polymerization reaction. Unlike solution polymerizations, varying the amount of catalyst has no appreciable effect on conversion or molecular weight.

It is necessary in achieving the desired results of the present invention to employ an aliphatic hydrocarbon, preferably an aliphatic hydrocarbon containing from five to eight carbon atoms such as normal heptane, hexane, etc., as diluent. If desired, gaseous aliphatic hydrocarbons such as propane, butane, etc., may also be used. In such case, the polymerization reactor is pressurized to maintain the diluent in the liquid state. The polymer products are insoluble in the aliphatic hydrocarbons and are obtained in the form of fine beads which may be recovered, dried and used directly as molding powders. When diluents are used in which the polymers are soluble or in which they form viscous materials, many disadvantages have been found to ensue. Thus, lower molecular weight polymers are generally obtained. In addition, some sort of precipitation or granulation process is necessary to obtain the polymers in easily handled form. Moreover, the impurities in the system, i.e. in the catalyst, monomer and equipment, prevent the obtainment of reproducible molecular weights.

Besides relatively pure aliphatic hydrocarbons, commercial forms of aliphatic hydrocarbons which contain, in addition to aliphatic hydrocarbons, small percentages of aromatic and cycloparaffinic hydrocarbons may be used.

High conversion to polymer is obtained by using relatively low weight ratios of aliphatic hydrocarbon to monomer. However, when less than about 0.3 part of aliphatic hydrocarbon per part of monomer is employed, special agitation is required because of the thickness of the reaction mass. When more than about 3 parts of aliphatic hydrocarbon per part of monomer is used, the conversion may be low. Preferably, I employ about 0.5 to 1 part of aliphatic hydrocarbon per part of monomer.

In order to realize high conversions in a reasonable reaction period, small amounts of certain ethers, preferably ethers containing at least one methyl group, must be added to the polymerization mixture as activators. These activators include alkyl monoethers containing at least one methyl group, dialkyl ethers of ethylene glycol, dialkyl ethers of polyethylene glycols and tetrahydrofuran. Alkyl groups other than methyl in the alkyl monoethers contain preferably from two to four carbon atoms. In the case of the dialkyl ethers of ethylene glycol and polyethylene glycols, the alkyl groups contain preferably from one to four carbon atoms.

Typical examples of the alkyl monoethers are dimethyl ether and methyl ethyl ether. Typical examples of the dialkyl ethers of ethylene glycol and polyethylene glycols are ethylene glycol dimethyl ether, ethylene glycol diethyl ether and diethylene glycol dimethyl ether.

Generally speaking, not more than about 10% by weight of activator based on the monomer is employed. Moreover, use of less than about 0.01% by weight of activator fails to give the desired results. Particularly outstanding results have been obtained using about 0.2 to 2% by weight of the activator.

It is particularly critical in achieving the results of the present invention to add at least about two-thirds by weight of the monomer in gradual manner after all the other ingredients of the polymerization reaction have been added. When this is not done, substantially lower and non-reproducible molecular weight polymers are obtained. Although all of the monomer may be added in gradual manner, I prefer, under certain conditions, to initiate the reaction by adding up to 25%, preferably about 10 to 25%, by weight of the monomer and then to gradually add the remaining monomer. Generally speaking, it has been found that monomer addition should be over a period of at least about ½ hour, preferably at least about one hour, up to about 10 hours.

The reaction temperature should not ordinarily be above about 30° C. since the molecular weight of the polymer tends to decrease at higher temperatures. Preferably, the polymerization temperature is maintained at from −10° C. to +20° C.

Agitation must be maintained during the reaction to keep the polymer in dispersed form. In addition, a dispersing agent is preferably incorporated in the polymerization mixture. When a dispersing agent is used, the polymer beads formed during the reaction are advantageously of generally uniform size. Although any dispersing agent which is inert in the reaction may be employed, I prefer to use relatively high molecular weight fatty acids or their salts. Among the suitable dispersing agents are oleic acid, stearic acid, sodium stearate, aluminum stearate, and octadecyl alcohol. When the free acids are used, they must be converted to salts by contact with the catalyst before reaction is initiated in order to avoid terminating the reaction.

Generall speaking, the amount of dispersing agent used is about 0.3 to 5%, preferably about 1 to 2%, by weight of the monomer. Use of a dispersing agent may be dispensed with if carefully controlled agitation is employed to obtain the desired dispersion.

After the reaction is complete, the reaction may be terminated by adding an alcohol, preferably a monohydric alcohol such as methanol, ethanol or isopropanol. Use of alcohols is advantageous since they destroy the catalyst, soak up residual monomers and dissolve out salts and dispersing agents. However, if desired, the reaction can be terminated by adding water to the reaction mixture and then steam distilling to remove unreacted monomer as overhead. Other terminating agents include air, alkyl halides, carbon dioxide, etc.

Generally speaking, the process of the present invention enables the obtainment of polymers in conversions of about 60% or higher. The absolute viscosities of 10% by weight solutions of these polymers in toluene (at 25° C.) are at least 10 centipoises, and usually 15 to 30 centipoises or higher. Such polymers have molecular weights in the order of about 50,000 or greater.

The reaction may be carried out in continuous manner by initiating the reaction as described above and then adding, in gradual manner, a mixture of monomer, catalyst, diluent, activator and dispersing agent, while continuously withdrawing polymer dispersion from the reaction zone. After an initial equilibration period, the polymer product becomes essentially constant in its properties. The withdrawn polymer dispersion is then sent to a separate zone for treatment with alcohol or other reaction terminating agent.

In operation, it is important to avoid the presence of air and water during the reaction. A clean dry reactor is purged with an inert gas, such as nitrogen or methane. An aliphatic hydrocarbon diluent, and preferably a dispersing agent, are charged to the reactor, and stirring is begun. A dispersion of an alkali metal catalyst is then added to the reactor. The reactor is cooled, usually to about −10° C. to +20° C., and an ether activator is added. Finally, monomer is added in gradual manner over a period of at least ½ hour. After addition of the monomer, the resulting polymer dispersion is stirred further, e.g. for a period of about ½ to 2 hours.

Preferably, up to about 25% by weight of total monomer is added initially in order to facilitate the inception of the polymerization reaction.

A terminating agent, such as methanol, is added to terminate the reaction. Stirring is continued for about ½ to 2 hours. The polymer is filtered, washed with additional alcohol and finally dried at a temperature of about 50° C. to 100° C.

The process yields a dispersion of polymer in the form of fine beads. Generally speaking, the bead side is extremely uniform, i.e. a product which is generally in the range of about 70 to 130% of the average size is attained which makes it useful for molding powders.

The alkyl-substituted vinyl aromatic polymers produced by the process of this invention have unusually good heat distortion temperatures, hardness and solvent resistance. The copolymers have the added advantage of possessing superior moldability and physical strength.

The following examples illustrate practice of the invention but are not to be construed as limiting the scope thereof. In the examples, except where otherwise indicated, parts are by weight.

*Example 1*

A glass reactor equipped with a stirrer, cooling coil and nitrogen inlet was purged with a stream of nitrogen to remove air therefrom. A slow nitrogen stream was continued during all subsequent operations. 48 parts of oleic acid, about 2770 parts of normal heptane and 56 parts of a dispersion of finely divided metallic sodium were then added to the reactor, and stirring was begun.

The sodium dispersion was prepared by heating a mixture of 195 parts mineral oil, 1 part oleic acid, 106 parts sodium to 100°–110° C. with high-speed stirring.

About 545 parts of alpha-methyl styrene were introduced into the reactor, and the reactor contents were cooled to a temperature of about 7° to 8° C. About 15.5 parts of 1,2-dimethoxyethane were then added to the reactor. Finally, about 3250 parts of alpha-methyl styrene were gradually added to the reactor at the rate of about 22.5 parts per minute. After addition of the monomer, which took about 2.4 hours, stirring of the resulting polymer dispersion was continued for about 1.7 hours.

9500 parts of methanol were then added to the reaction mixture, and stirring was continued for about 1 hour. The polymer dispersion was filtered, washed with methanol and finally dried at a temperature of about 50° C.

There were obtained 2680 parts of alpha-methyl styrene polymer in the form of small beads. This corresponded to a conversion of 71%. A 10% by weight solution of the polymer in toluene had an absolute viscosity of 22.6 centipoises at 25° C.

The polymer was molded into standard test pieces. It exhibited a tensile strength of 5720 pounds per square inch, a flexural strength of 11,690 pounds per square inch and a heat distortion temperature of 125° C. at 66 pounds per square inch.

*Example 2*

The process of Example 1 was carried out except that about 12.9 parts of 1,2-dimethoxyethane were employed and the reaction temperature was maintained within the range of about 4° to 12° C. 2600 parts of alphamethyl styrene polymer were obtained, corresponding to a conversion of 68%. A 10% by weight solution of the polymer in toluene had an absolute viscosity of 25.3 centipoises at 25° C.

*Example 3*

54 parts of oleic acid were added to the reactor of Example 1, together with about 3146 parts of normal heptane. 100 parts of a dispersion of finely divided metallic sodium were then added to the reactor.

The sodium dispersion was prepared by heating a mixture of 103 parts sodium, 150 parts odorless mineral spirits, 0.7 part lecithin, 0.5 part oleic acid to 100°–110° C. with high speed agitation.

About 610 parts of a monomer mixture comprising 85% by weight alpha-methyl styrene and 15% by weight styrene were added to the reactor, and the reaction mixture was cooled to a temperature of about 3° to 7° C. About 21.6 parts of 1,2-dimethoxyethane were introduced into the reactor. Finally, about 3170 parts of the monomer mixture were gradually introduced at the rate of about 22 parts per minute. After addition of the monomer mixture, the resulting polymer dispersion was stirred further for about 1.5 hours.

9500 parts of methanol were then added, and stirring was continued for about 1 hour. The polymer dispersion was filtered, washed with methanol and finally dried at 60° C.

2350 parts of polymer in the form of small beads were obtained. This corresponded to a conversion of 62%. A 10% by weight solution of the polymer in toluene had an absolute viscosity of 17.3 centipoises at 25° C.

The polymer was molded into standard test pieces. The molded polymer had a tensile strength of 6250 pounds per square inch, a flexural strength of 15,060 pounds per square inch and a heat distortion temperature of 137° C. at 66 pounds per square inch.

*Example 4*

The process of Example 3 was carried out except that the monomer mixture employed comprised 75% by weight alpha-methyl styrene and 25% by weight styrene. In addition, the sodium dispersion contained a small amount of pyridine.

2515 parts of copolymer, corresponding to a conversion of 66% were obtained. A 10% by weight solution of the polymer in toluene had an absolute viscosity of 19.3 centipoises at 25° C.

When the processes of Examples 1 to 4 were repeated, polymers having similar absolute viscosity values (±1–2 centipoises) were obtained. Thus, these processes enable the production of polymers having reproducible molecular weights.

*Example 5*

A series of runs was carried out to determine the effect of concentration of activator and feed rate on the polymerization reactions of the present invention. In these runs, about 2 parts of oleic acid and about 113 parts of normal heptane were added to an air-free reactor provided with a stirrer, cooling coil and nitrogen inlet. 4 parts of a dispersion of finely divided metallic sodium were then added, and stirring was begun.

The sodium dispersion was prepared by heating a mixture of 45–50 parts sodium and 50–55 parts petrolatum to 105°–115° C. with high-speed agitation.

The reactor contents were cooled to about 3° to 7° C., and varying amounts of 1,2-dimethoxyethane were added. Finally, about 140 parts of alpha-methyl styrene monomer were gradually added at varying rates. After addition of the monomer, the resulting polymer dispersion was stirred further for 2½ hours.

About 400 parts of methanol were then added, and stirring was continued for 0.5 to 1 hour. The polymer dispersion was filtered, washed with methanol and finally dried at a temperature of about 70° C.

The following results indicated that molecular weight of the polymer increased as the concentration of 1,2-dimethoxyethane decreased and as the monomer feed rate decreased.

| | Average Conversion (Percent) | Average 10% Absolute Viscosity (Centipoises) |
|---|---|---|
| Feed rate—about 0.9 part/minute 1,2-dimethoxyethane—about 0.9 part | 66 | 14.1 |
| Feed rate—about 0.9 part/minute 1,2-dimethoxyethane—about 0.45 part | 63 | 19.2 |
| Feed rate—about 0.45 part/minute 1,2-dimethoxyethane—about 0.9 part | 63 | 25.3 |
| Feed rate—about 0.45 part/minute 1,2-dimethoxyethane—about 0.45 part | 65 | 31.4 |

*Example 6*

Several runs were carried out in the manner described in Example 5 to show utility of commercial aliphatic hydrocarbon solvents as diluents. The following results were obtained:

| Diluent | Diluent (Parts) | 1,2-dimethoxyethane (Parts) | Monomer Feed rate (Parts/Min.) | Conversion (Percent) | 10% Absolute Viscosity (Centipoises) |
|---|---|---|---|---|---|
| Amsco Heptane [1] | 111 | *0.45 | *0.41 | 77 | 19.3 |
| Skellysolve B [2] | 113 | *0.45 | *0.49 | 67 | 18.4 |

[1] A commercial product comprising 43% paraffin hydrocarbons (mainly normal heptane), 55% naphthenes (cyclohexane and methylcyclohexane) and 2% toluene.
[2] A commercial product comprising 91% paraffin hydrocarbons (mainly hexane), 5% naphthenes and 4% benzene.
* About.

*Example 7*

Several runs were carried out using various activators coming within the scope of the present invention. In these runs, 102 parts of normal heptane, 2 parts of oleic acid, 4–5 parts of a dispersion of finely divided metallic sodium and 9 to 18 parts of alpha-methyl styrene were mixed in an air-free reactor provided with a stirrer, cooling coil and nitrogen inlet.

The sodium dispersion was prepared by subjecting a mixture of 160 parts sodium, 160 parts odorless mineral spirits, 0.8 part lecithin and 1.6 parts oleic acid to 115°–120° C. with high-speed agitation.

The activator was added, and the mixture was cooled to about 5° C. Additional alpha-methyl styrene was then gradually introduced into the reactor. After addition of the monomer, the resulting polymer dispersion was stirred further for about 1.5 hours.

About 400 parts of methanol were then added, and stirring was continued for about 0.5 to 1 hour. The polymer dispersion was filtered, washed with methanol and dried at about 75° C.

The following results were obtained:

| Activator | Activator (Parts) | Total Monomer Added (Parts) | Monomer Addition Time (Hours) | Conversion (Percent) | 10% Absolute Viscosity (Centipoises) |
|---|---|---|---|---|---|
| Diethylene glycol dimethyl ether | 1.4 | 140 | 4 | 69 | 22.2 |
| Tetrahydrofuran | 0.9 | 202 | 4.7 | 67 | 12.9 |
| Ethylene glycol diethyl ether | 0.8 | 180 | 3 | 64 | 21.9 |

*Example 8*

A run using dispersed phenyl sodium as a catalyst was carried out in the following manner. A mixture of 102 parts of normal heptane, 2 parts of oleic acid, 3.9 parts of chlorobenzene and 1.85 parts of sodium was allowed to react completely in an air-free reactor provided with a stirrer, cooling coil and nitrogen inlet. The reaction was initiated by adding 0.08 part of isopropyl alcohol. 18 parts of alpha-methyl styrene and 1.7 parts of 1,2-dimethoxyethane were added to the reactor. 162 parts of alpha-methyl styrene were then gradually introduced over a 3 hour period. The reactor was cooled to about 5° C. as soon as reaction began, as evidenced by a change in color of the reaction mixture. After addition of the monomer, the resulting polymer dispersion was stirred further for 1.5 hours.

400 parts of methanol were then added, and stirring was continued for one hour. The polymer dispersion was filtered, washed with methanol and dried at 80° C. 114 parts of alpha-methyl styrene polymer, representing a 63% conversion, were obtained. A 10% by weight solution of the polymer in toluene had an absolute viscosity of 14.7 centipoises at 25° C.

*Example 9*

A run using dispersed amyl sodium as catalyst was carried out in the following manner. A mixture of 102 parts of normal heptane, 2 parts of oleic acid, 3.5 parts of amyl chloride and 1.9 parts of sodium was allowed to react completely in an air-free reactor provided with a stirrer, cooling coil and nitrogen inlet. 27 parts of alpha-methyl styrene and 0.85 part of 1,2-dimethoxyethane were then added. The reactor was cooled to about 5° C., and 135 parts of alpha-methyl styrene were added gradually over about a 4 hour period. After addition of the monomer, the resulting polymer dispersion was stirred further for 1.5 hours.

400 parts of methanol were then added, and stirring was continued for 15 minutes. The polymer dispersion was filtered, washed with methanol and dried at a temperature of 70° C. The dried polymer constituted 127 parts, which represented a conversion of 78%. A 10% by weight solution of the polymer in toluene had an absolute viscosity of 14.8 centipoises at 25° C.

*Example 10*

A continuous polymerization run was carried out as follows:

An air-free reactor provided with a stirrer, cooling coil and nitrogen inlet was arranged to permit continuous addition of reagents and continuous removal of reaction mixture. To the reactor were added 205 parts of normal heptane, 3.6 parts oleic acid, 26 parts of a dispersion of finely divided metallic sodium, 40 parts of alpha-methyl styrene and 4.8 parts of styrene.

The sodium dispersion was prepared by subjecting a mixture of 480 parts sodium, 480 parts odorless mineral spirits and 7.2 parts aluminum stearate to high-speed agitation at a temperature of about 110°–120° C. 60 parts of this mixture were diluted with 136 parts of normal heptane before use.

The reactor was cooled to 5°–10° C., and 1.2 parts of 1,2-dimethoxyethane were added. During the next 107 minutes, a mixture of 190 parts of alpha-methyl styrene and 23 parts of styrene were gradually introduced. Continuous operation was now begun. The polymerization ingredients were fed gradually at the following rates:

| | Parts per hour |
|---|---|
| Normal heptane | 184 |
| Sodium oleate | 3.8 |
| Alpha-methyl styrene | 217 |
| Styrene | 26.6 |
| 1,2-dimethoxyethane | 1.2 |
| Sodium dispersion | 26 |

The reaction mixture was removed continuously, keeping a constant liquid level in the reactor. The reaction mixture removed during each 0.5 hour period was collected in 400 parts of methanol, stirred for 0.5 hour, allowed to stand 1–2 hours, then filtered, washed with methanol and dried at 70°–80° C. 10% by weight solution viscosities in toluene (at 25° C.) of polymer samples collected over a 3 hour period are shown in the following table:

| Sample Number | Time (Hours) | 10% Absolute Viscosity (Centipoises) |
|---|---|---|
| 1 | 0–0.5 | 34 |
| 2 | 0.5–1.0 | 41 |
| 3 | 1.0–1.5 | 39 |
| 4 | 1.5–2.0 | 41 |
| 5 | 2.0–2.5 | 45 |
| 6 | 2.5–3.0 | 39 |

While the preferred embodiments for carrying out the process of this invention have been described, it will be apparent that many changes may be made without departing from the spirit of the invention.

I claim:

1. A process for preparing reproducible high molecular weight polymers in the form of uniform fine beads which comprises polymerizing a monomer material of the group consisting of alpha-alkyl styrenes having the general formula:

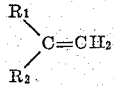

wherein $R_1$ is phenyl and $R_2$ is an alkyl group, and mixtures of said alpha-alkyl styrenes and styrene at temperature of from $-10°$ C. to $+20°$ C. in the presence of (1) finely divided metallic sodium as catalyst, (2) an aliphatic hydrocarbon as diluent, (3) a small amount of 1,2-dimethoxyethane as activator and (4) a dispersing agent, about two-thirds by weight of the monomer material being added in gradual manner subsequent to the other polymerization ingredients.

2. A process for preparing reproducible high molecular weight polymers in the form of uniform fine beads which comprises polymerizing an alpha-alkyl styrene monomer having the general formula:

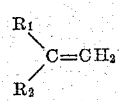

where $R_1$ is phenyl and $R_2$ is an alkyl group, at temperature of from $-10°$ C. to $+20°$ C. in the presence of (1) finely divided metallic sodium as catalyst, (2) an aliphatic hydrocarbon as diluent, (3) a small amount of 1,2-dimethoxyethane as activator and (4) a dispersing agent, at least about two-thirds by weight of the monomer being added in gradual manner subsequent to the other polymerization ingredients.

3. A process for preparing reproducible high molecular weight polymers in the form of uniform fine beads which comprises polymerizing a monomer mixture of an alpha-alkyl styrene having the general formula:

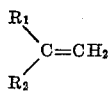

where $R_1$ is phenyl and $R_2$ is an alkyl group, and styrene at temperature of from $-10°$ C. to $+20°$ C. in the presence of (1) finely divided metallic sodium as catalyst, (2) an aliphatic hydrocarbon as diluent, (3) a small amount of 1,2-dimethoxyethane as activator and (4) a dispersing agent, at least about two-thirds by weight of the monomer mixture being added in gradual manner subsequent to the other polymerization ingredients.

4. A process for preparing reproducible high molecular weight polymers in the form of fine beads which comprises polymerizing a monomer material selected from the group consisting of alpha-alkyl styrenes having the general formula:

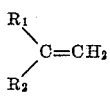

wherein $R_1$ is phenyl and $R_2$ is an alkyl group, and mixtures of said alpha-alkyl styrenes and styrene in the presence of (1) a catalyst selected from the group consisting of alkali metals, alkali metal hydrides, alkali metal alkyls and alkali metal aryls, (2) an aliphatic hydrocarbon as diluent and (3) a small amount of 1,2-dimethoxyethane as activator, at least about two-thirds by weight of the monomer material being added in gradual manner subsequent to the other polymerization ingredients.

5. A process for preparing reproducible high molecular weight polymers in the form of fine beads which comprises polymerizing a monomer material selected from the group consisting of alpha-alkyl styrenes having the general formula:

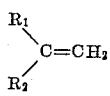

wherein $R_1$ is phenyl and $R_2$ is an alkyl group, and mixtures of said alpha-alkyl styrenes and styrene in the presence of (1) a catalyst selected from the group consisting of alkali metals, alkali metal hydrides, alkali metal alkyls and alkali metal aryls, (2) an aliphatic hydrocarbon as diluent and (3) a small amount of tetrahydrofuran as activator, at least about two-thirds by weight of the monomer material being added in gradual manner subsequent to the other polymerization ingredients.

6. A process for preparing reproducible high molecular weight polymers in the form of fine beads which comprises polymerizing a monomer material selected from the group consisting of alpha-alkyl styrenes having the general formula:

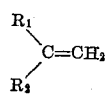

wherein $R_1$ is phenyl and $R_2$ is an alkyl group, and mixtures of said alpha-alkyl styrenes and styrene in the presence of (1) a catalyst selected from the group consisting of alkali metals, alkali metal hydrides, alkali metal alkyls and alkali metal aryls, (2) an aliphatic hydrocarbon as diluent and (3) a small amount of an alkyl monoether containing at least one methyl group as activator, at least about two-thirds by weight of the monomer material being added in gradual manner subsequent to the other polymerization ingredients.

References Cited in the file of this patent
UNITED STATES PATENTS

| | | |
|---|---|---|
| 2,327,082 | Walker | Aug. 17, 1943 |
| 2,731,450 | Serniuk | Jan. 17, 1956 |
| 2,920,065 | Myerholtz et al. | Jan. 5, 1960 |

OTHER REFERENCES

Williams et al.: J. Am. Chem. Soc., vol. 79, pages 1716–1720 (pages 1716 and 1717 relied upon), Apr. 5, 1957.

Boundy-Boyer: "Styrene," Reinhold Pub. Corp., N.Y. (1952), pages 52, 255–256.